United States Patent [19]
Plotkin et al.

[11] Patent Number: 5,153,237
[45] Date of Patent: Oct. 6, 1992

[54] RADIATION CURABLE PROPENYL ETHER RESINS

[75] Inventors: Jeffrey S. Plotkin, Monsey, N.Y.; Mark M. Miller, Ridgewood, N.J.

[73] Assignee: ISP Investments Inc., Wilmington, Del.

[21] Appl. No.: 756,714

[22] Filed: Sep. 9, 1991

[51] Int. Cl.$^5$ .............. C08F 2/50; C08F 283/04; C08G 18/48; C07C 261/00

[52] U.S. Cl. .............. 522/90; 522/97; 522/170; 522/174; 525/455; 525/460; 526/301; 528/367; 560/26; 560/158

[58] Field of Search .............. 522/170, 174, 97, 90; 560/26, 158; 525/455, 460; 526/301; 528/367

[56] References Cited

U.S. PATENT DOCUMENTS

| | | | |
|---|---|---|---|
| 2,464,519 | 10/1945 | Lichty et al. | 560/158 |
| 3,887,607 | 6/1975 | Kehr et al. | 560/26 |
| 3,928,287 | 12/1975 | Jellinek et al. | 560/158 |
| 3,950,285 | 4/1976 | Wolgemuth | 560/26 |
| 4,751,273 | 6/1988 | Lapin et al. | 560/158 |
| 5,045,572 | 9/1991 | Plotkin et al. | 522/170 |
| 5,055,357 | 10/1991 | Plotkin et al. | 522/170 |

Primary Examiner—Marion E. McCamish
Assistant Examiner—Susan Berman
Attorney, Agent, or Firm—Marilyn J. Maue; Joshua J. Ward

[57] ABSTRACT

This invention relates to a polypropenyl ether having the formula

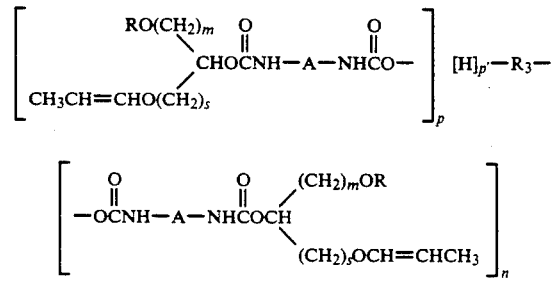

wherein m and s each independently have a value of from 1 to 6; R is alkyl or phenyl optionally substituted with lower alkyl or halogen; A is $C_1$ to $C_{12}$ alkylene, aryl or $-R_1OR_2-$, optionally substituted with lower alkyl, haloalkyl, halogen or phenyl; one of p and p' has a value of one and the other is zero; $R_3$ is $C_1$ to $C_{20}$ alklylene substituted with expression indicated by n and n has a value of from 1 to 10.

18 Claims, No Drawings

RADIATION CURABLE PROPENYL ETHER RESINS

BACKGROUND OF THE INVENTION

It is known that certain acrylate and urethane coating materials can be cured thermally or by radiation in the presence of a free-radical photoinitiator but that they do not lend themselves to cationically induced polymerization. It is well recognized that thermal curing is not cost efficient and that radiation curing in free-radical systems is oxygen inhibited, thus requiring an inert atmosphere or the minimizing affect of a hydrogen donating component. However, the later expedient is not completely satisfactory since such components significantly reduce the rate of reaction. also, it has been found that polymerization or curing in free radical systems ceases almost immediately upon removal from the source of radiation; thus, the cured product often contains significant amounts of unpolymerized components. Accordingly, it is an aim of research to develop monomers or oligomers which provide stable formulations with the above polymerizable materials while incorporating their beneficial properties in the finished product. Additionally, it is desirable that such monomers or their oligomers be amenable to radiation curing at a rapid rate under mild temperature conditions by cationically induced polymerization which is not oxygen inhibited and which permits continued polymerization after removal from the source of radiation exposure. Further, it would be beneficial if the monomer or oligomer, when used as a diluent for such polymerizable materials, would be capable of minimizing undesirable properties of certain coating materials, such as the acrylate monomers which are known skin irritants.

Accordingly, it is an object of the present invention to overcome the above deficiencies and to provide polypropenyl ethers which are readily polymerizable to thermally stable compounds having superior coating properties and which provide films having good adhesion and high resistance to chemical attack.

Another object of this invention is to provide an economical and commercially feasible process for preparing the polypropenyl ethers of this invention.

Still another object is to provide coatings and finishes for adhesion resistant surfaces such as metal and glass, which coatings are not subject to coloration or extended periods of use.

These and many other objects of the invention will become apparent from the following description and disclosure.

THE INVENTION

In accordance with this invention there is provided a radiation curable, polypropenyl ether having the formula

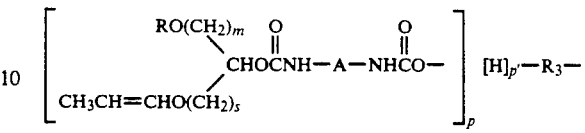

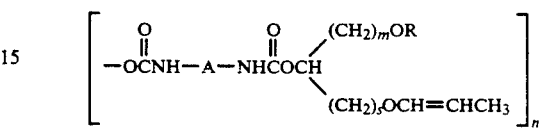

wherein m and s each independently have a value of from 1 to 6; R is alkyl or phenyl optionally substituted with lower alkyl or halogen; A is $C_2$ to $C_{12}$ alkylene, aryl, or $—R_1OR_2—$, optionally substituted with lower alkyl, haloalkyl, halogen or phenyl; one of p and p' has a value of one and the other of p and p' is zero; $R_3$ is $C_1$ to $C_{20}$ alkylene substituted with the expression indicated by n and n has a value of from 1 to 10.

The divalent A radical includes for example, linear, branched and cyclic $C_2$ to $C_{12}$ alkylene radicals and mono- and di- cyclic aryl radicals, specific examples of which include butylene; hexylene; 2,4-dimethyl hexylene; 2,2,4-trimethyl hexylene; decylene; dodecylene; 2,4,6-trimethyl octylene; phenylene; naphthylene; tolylene; bisphenylene;

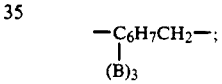

$—C_6H_4C(B)_2C_6H_4—$; $—C_6H_{10}C(B)_2C_6H_{10}—$, and $—C(B)_2C_6H_4C(B)_2—$ where B is hydrogen or methyl; which radicals may be additionally substituted with a halogen, haloalkyl, lower alkyl or phenyl radical.

The above polypropenyl ethers are prepared according to the following equation:

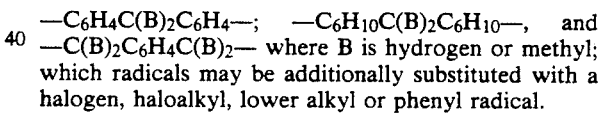

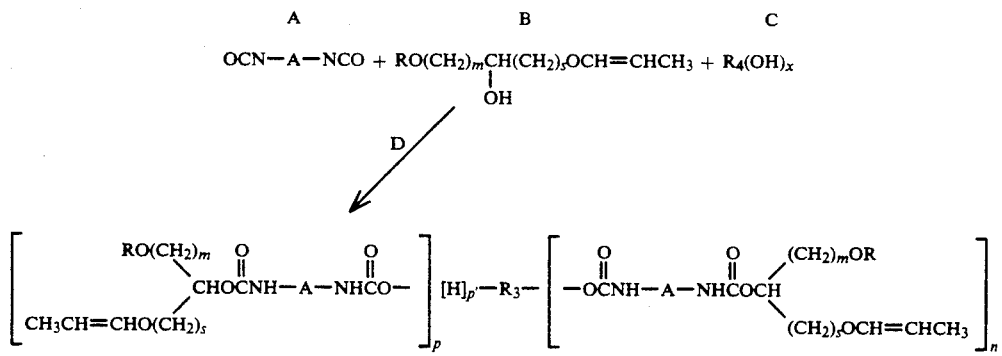

wherein n, s, p, p', n, R, A and $R_3$ are as defined; $R_4$ is $C_1$ to $C_{20}$ alkylene and x has a value of from 1 to 10.

Specifically, the reaction is carried out by forming a liquid mixture of compounds A, C in a mole ratio of between about 1:2 and about 1:4, preferably 1:2 to form a prepolymer having the structure

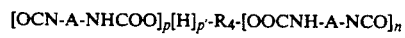

and then adding C in a mole ratio of between about 1:2 and 1:4 with respect to B. Suitable examples of reactant A include chlorobenzene diisocyanate, dichloro benzenediisocyanate, diisocyanto benzene, diisocyanto toluene, diisocyanto xylene, bromobenzene diisocyanate, fluorobenzene diisocyanate, bis(phenylisocyanate); bis(2-methyl-phenylisocyanate); diisocyanato dibutyl ether., diisocyanato dipropyl ether; diisocyanato diethyl ether; 1,4-diisocyanato diphenyl; 2,2-bis(4-isocyanato phenyl) propane, bis(4-isocyanato phenyl) methane, etc.

Examples of coreactant B include the propenyl ethers of 2-hydroxy butyl methyl ether, 6-hydroxydecyl methyl ether, 4-hydroxyoctyl methyl ether, 2-hydroxypropyl methyl ether, 3-hydroxybutyl methyl ether and the like.

Suitable examples of reactant C include 1,1,1-trimethylol propane, 1,4-dimethylol butane, 1,1,3,5,7-pentamethylol heptane, perhydroxy decane, perhydroxy octane, perhydroxy butane, dihydroxy ethane, butanol, propanol, decanol, eicosanol, etc.

The reaction is carried out in the presence of a base catalyst such as, e.g. dibutyl tin dilaurate, diazabicyclo octane, triethylamine, 1,8-diazabicyclo[5.3.0]undec-7-ene, metal acetylacetonates of manganese, vanadium, iron, cobalt, and chromium and the like, which catalyst is employed in a concentration of between about 0.01 and 0.5 weight %, preferably between about 0.02 and about 0.3 weight %, based on total reactants.

In cases where the mixture of reactants results in a liquid having a viscosity such that good agitation becomes difficult, up to about 50 weight % of an inert solvent can be added to the mixture. Suitable solvents include toluene, xylene, benzene, methylene chloride, tetrahydrofuran; ketones such as methyl ethyl ketone, acetone, methyl isobutyl ketone, amides such as N-methylpyrrolidone, dimethylforamide and N-ethylpyrrolidone; esters such as butyrolactone and ethyl acetate or mixtures of these and the like. Where the isocyanate reactant is a solid, it can be melted or dissolved in one of the above solvents or solvent mixtures before reacting.

The present reaction is effected in the liquid phase by agitating the reactants under a blanket of inert gas such as nitrogen, argon, etc. at a temperature within the range of about between about 30° and about 100° C. under atmospheric pressure up to 50 psig. The reaction takes place over a period of from about 1 to about 20 hours. The preferred reaction conditions include a temperature of between about 50° and about 70° C. under atmospheric pressure for a period of from about 2 to 8 hours. Upon completion of the reaction, the product is recovered by distillation to remove any unreacted materials.

The products of this process are useful as molding resins and highly solvent resistant adhesive coatings The product can be applied to a glass, metal, wood, paper or other surfaces in a thickness of between about 0.1 to about 5 mils and cured by exposure to a source of radiation such as UV light, electon beam or laser emission or exposure to radiation rays such as X-rays, gamma-rays, etc. in the presence of an onium photoinitiator such as, for example a diaryl iodonium salt, a polyphenyl sulphonium fluoride, and the like. Curing by UV light exposure is generally effected at between about 300 and about 3,000 milli joules/cm$^2$. Radiation curing is completed in less than 5 minutes, usually less than 1 minute exposure; whereas curing by heat requires a longer treatment up to about 2 hours. The present compounds provide clear, colorless, flexible films which find many applications. Additionally, the present products can be combined with up to about 60 wt. % of other monomers, such as the divinyl ether of ethylene glycol (DVE), the divinyl ether of cyclohexane dimethanol (CHVE), the propylene ether of propylene carbonate (PEPC), tetrahydrofurfuryl vinyl ether, epoxides, e.g. 3,4-epoxycyclohexyl- 3,4-epoxycyclohexane carboxylate; 1,4-butanediol diglycidyl ether, etc. and, in the presence of a cationic initiator, cured by exposure to radiation so as to provide a protective coating or film.

Having thus generally described the invention, reference is now had to the accompanying examples which illustrate preferred embodiments but which are not construed as limiting to the scope of the invention as more broadly set forth above and in the appended claims.

EXAMPLE 1

A. Into a 1500 cc round bottom flask equipped with a mechanical stirrer, reflux condenser and addition buret was added 800 g of methanol and 10 g of sodium methoxide. The mixture was heated to 64° C. and reflux. To this mixture, 286 grams of propenyl glycidyl ether (PGE) was added continuously over a 2 hour period, being sure to maintain a stable reflux condition. At this point gas chromatographic analysis showed 88% conversion of PGE, however; after 2 additional hours of reflux conversion was complete. The flask was then fitted with a distillation head, and 710 grams of methanol was stripped off. The reaction product 1-propenyloxy-3-methoxy-2-propanol was then purified by fractional distillation and 310 g of 98.6% pure product was recovered. Structure was confirmed by Fourier Transform Infra red and H$^1$NMR spectroscopy.

B. Into a 1-liter sealed reactor was introduced 143.2 g (0.822 mole) of toluene 2,4-diisocyanate (TDI) dissolved in 80 cc of dry tetrahydrofuran (THF) and 36.77 g (0.274 mole) of 1,1,1-trimethylol propane (TMP) dissolved in 60 cc of THF under a nitrogen atmosphere, and the mixture agitated for 2 hours at 55° C. to form an intermediate having the formula

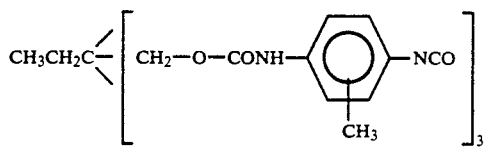

Then 120.1 g (0.822 mole) of 1-propenyloxy-3-methoxy-2propanol (MOPGE) was added at a controlled rate over a period of about 12 minutes The reaction was monitored by volumetric isocyanate analysis, and proceeded to completion in 4 hours at 55° C. The solvent was then removed under vacuum and the resulting waxy solid

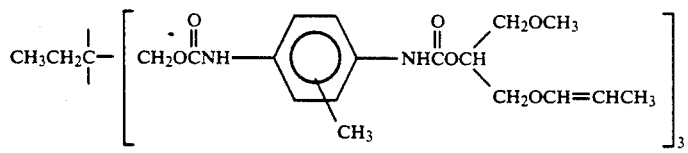

in 100% conversion was recovered and the product confirmed by H¹NMR and Fourier Transform Infra red spectroscopy.

EXAMPLE II

The product of Example I was used to make a radiation curable formulation by containing 49% of said product 49% divinyl ether of triethylene glycol and 2% of triphenyl sulfonium salt initiator. The formulation was coated on an aluminum panel and cured using a 400 mJ/cm² PPG model QC-1202A/N U.V. processor. The coating performance of said cured polymer was compared to those of a commercial urethane vinyl ether oligomer (CB # 2) and Epon-828 (an epoxide resin). Results are summarized in the following table.

EXAMPLE IV

Example 1B is repeated except that 228.8 g (0.822 moles) of 2,2-bis(4-isocyanato phenyl) propane is substituted for 143.2 g of toluene-2,4-diisocyanate. One hundred % conversion to product

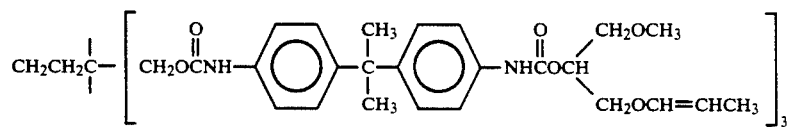

is obtained.

EXAMPLE V

Example III is repeated except that 205.7 g (0.822 mole) of bis(4-isocyanato phenyl) methane is substituted for 143.2 g of toluene-2,4-diisocyanate. One hundred % conversion to product

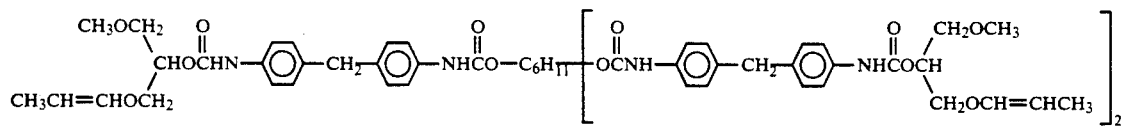

is obtained.

TABLE

| OLIGOMER | COATING THICKNESS | MAX. CURE SPEED (fpm) | PENCIL HARDNESS | | ADHESION % | | MANDRELL BEND | | MEK RUBS | |
|---|---|---|---|---|---|---|---|---|---|---|
| Product of Example I | 0.28 | 700 | 4B | 2H | 0 | 100 | ⅛ | ⅛ | 5 | 29 |
| CB #2 89* | 0.30 | 700 | 2B | 2H | 0 | 100 | 3/16 | ⅛ | 6 | 82 |
| Epon-828** | 0.33 | 500 | 2H | 2H | 100 | 100 | ⅛ | ⅛ | 1 | 28 |
| Product of Example I | 1.25 | 500 | <4B | F | 0 | 0 | ⅛ | ⅛ | 90 | >100 |
| CB #2 89 | 1.41 | 500 | <4B | 2B | 0 | 0 | 3/16 | 3/16 | 69 | >100 |
| Epon-828 | 1.61 | 300 | <4B | 2H | 0 | 100 | 3/16 | ⅛ | 23 | >100 |

*vinyl ether terminated urthane isocyanate oligomer
**the diglycidyl ether of bisphenol A

EXAMPLE III

Example 1B is repeated, except that 36.77 g (0.274 mole) of 1,2,6-hexanetriol is substituted for 36.77 g of 1,1,1-trimethylol propane. One hundered % conversion to product

EXAMPLE VI

Example 1B is repeated except that 27.98 g (0.205 mole) of pentaerithrytol is substituted for 36.77 g of 1,1,1-trimethylol propane and dichlorobenzene-2,4-diisocyanate is substituted for toluene-2,4-diisocyanate. One hundred % conversion to product

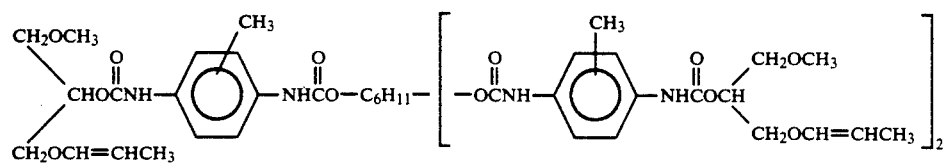

is obtained.

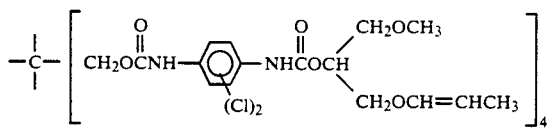

is obtained.

EXAMPLE VII

Example IIB is repeated except that 54.28 g (0.411 mole) of 2-hydroxymethyl pentanol is substituted for 36.77 g of 1,1,1-trimethylol propane and 151.41 g (0.822 mole) of bis(3-isocyanatopropyl) ether is substituted for 143.2 g of toluene-2,4-diisocyanate. One hundred % conversion to product

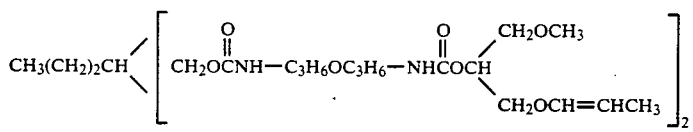

is obtained.

What is claimed is:

1. A propenyl ether resin having the formula

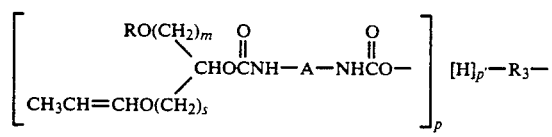

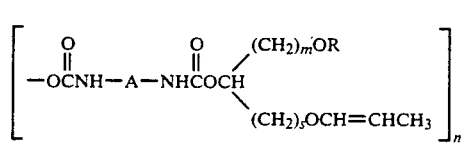

wherein m and s each independently have a value of from 1 to 6; R is alkyl or phenyl optionally substituted with lower alkyl or halogen; A is $C_2$ to $C_{12}$ alkylene, aryl, or $-R_1OR_2-$, optionally substituted with lower alkyl, haloalkyl, halogen or phenyl; one of p and p' has a value of one and the other is zero; $R_3$ is Chd 1 to $C_{20}$ alkylene substituted with expression indicated by n and n has a value of from 1 to 10.

2. The resin of claim 1 wherein p is one and p' is zero.
3. The resin of claim 1 wherein p is zero and p' is one.
4. The resin of claim 1 wherein A is an aromatic moiety.
5. The resin of claim 1 wherein n has a value of from 2 to 5.
6. The resin of claim 1 having the formula

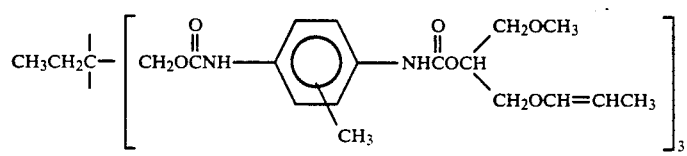

7. The resin of claim 1 having the formula

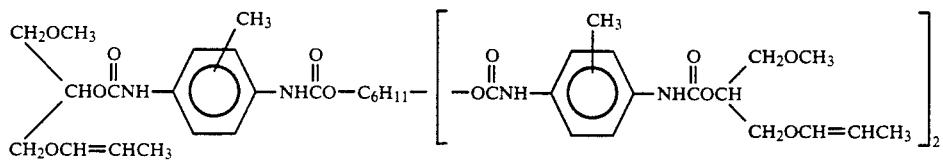

8. The resin of claim 1 having the formula

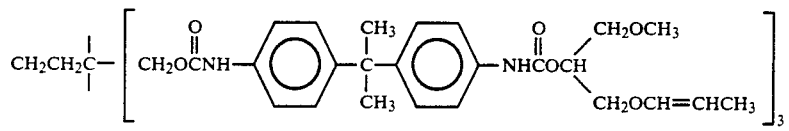

9. The resin of claim 1 having the formula

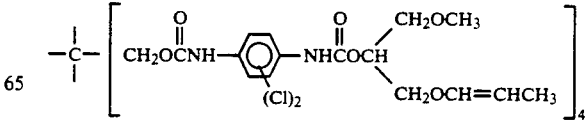

10. The resin of claim 1 having the formula

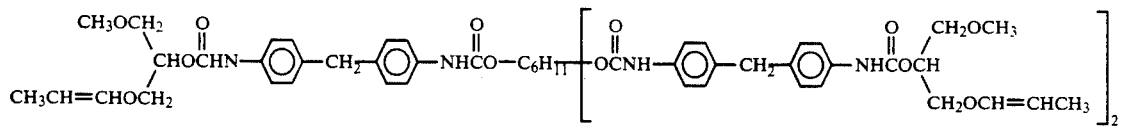

11. The resin of claim 1 having the formula

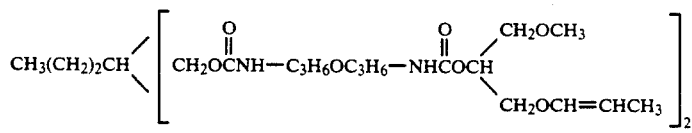

12. A radiation curable composition comprising the resin of claim 1 and a polymerization initiating amount of a cationic initiator.

13. The composition of claim 12 wherein said resin is

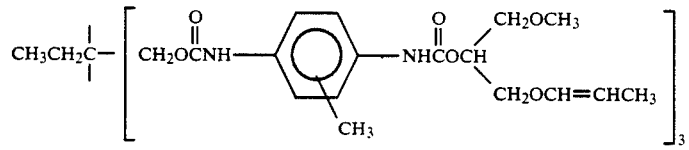

14. The composition of claim 12 which additionally contains up to 60 wt % of a vinyl ether comonomer.

15. A substrate having on its surface a cured coating of the resin of claim 14.

16. The composition of claim 12 which additionally contains a minor amount of an epoxide comonomer.

17. A substrate having on its surface a cured coating of the resin of claim 16.

18. A substrate having on its surface a cured coating of the resin of claim 1.

* * * * *